(No Model.)
L. ROSENFELD.
METALLIC WATER COLOR IN LEAD TUBES.
No. 452,583. Patented May 19, 1891.
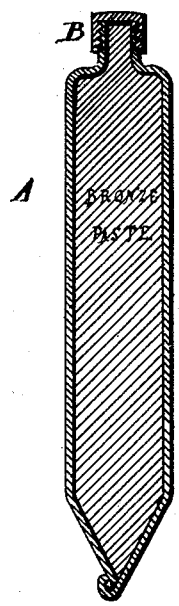
WITNESSES:
INVENTOR
L. Rosenfeld
BY
ATTORNEYS

UNITED STATES PATENT OFFICE.

LOUIS ROSENFELD, OF NEW YORK, N. Y.

METALLIC WATER-COLOR IN LEAD TUBES.

SPECIFICATION forming part of Letters Patent No. 452,583, dated May 19, 1891.

Application filed January 31, 1891. Serial No. 379,773. (No specimens.)

*To all whom it may concern:*

Be it known that I, LOUIS ROSENFELD, of the city of New York, in the county of New York, State of New York, a citizen of the United States, have invented certain new and useful Improvements in Metallic Water-Color in Lead Tubes, of which the following is a specification.

The object of my invention is to provide a new and improved water-color paste which can be readily dissolved in water to form a metallic paint.

In the accompanying drawing a longitudinal sectional view of a lead tube containing my improved metallic water-colored paste is shown.

In preparing the improved metallic water-colored paste I mix any suitable bronze-powder or metal powder of any desired color with the following composition: one pound of gum-arabic dissolved in one pint of water; or, in place of gum-arabic, gum-dextrine, glue, gum-tragacanth, gelatine, or any gum or paste that dissolves in water may be used. To eight parts of this gum solution I add two parts of molasses or sirup, or dissolved sugar, maple-sugar, rock-candy, honey, or any other saccharine matter, and also one part of pure glycerine that can be mixed with water.

The bronze-powder or other metallic paint-powder is suitably ground in with the above composition to form a paint-paste, which can readily be thinned by adding water. This paint-paste is filled into ordinary painters' lead tubes A, ready for market.

When the metallic water-color is to be used, the cap B is removed from the lead tube A and a small quantity of the metallic water-colored paste is forced out, and then sufficient water is added to the paste to give it the desired consistency.

Having thus described my invention, I claim as new and desire to secure by Letters Patent—

As an improved article of manufacture, a metallic water-color paste composed of a metallic powder ground in a mixture of gum soluble in water, saccharine matter, and glycerine in the proportions given, substantially as set forth.

In testimony that I claim the foregoing as my invention I have signed my name in presence of two subscribing witnesses.

LOUIS ROSENFELD.

Witnesses:
OSCAR F. GUNZ,
JOHN A. STRALEY.